(12) United States Patent
Surek et al.

(10) Patent No.: US 7,864,817 B2
(45) Date of Patent: *Jan. 4, 2011

(54) TRANSPORT SYSTEMS AND METHODS INCORPORATING ABSOLUTE TIME REFERENCES AND SELECTIVE BUILDOUT DELAYS

(75) Inventors: Steven A. Surek, Leonardo, NJ (US); Eddie Fung, Englishtown, NJ (US)

(73) Assignee: Ciena Corporation, Linthicum, MD (US)

( * ) Notice: Subject to any disclaimer, the term of this patent is extended or adjusted under 35 U.S.C. 154(b) by 975 days.

This patent is subject to a terminal disclaimer.

(21) Appl. No.: 11/599,662

(22) Filed: Nov. 15, 2006

(65) Prior Publication Data

US 2007/0165549 A1 Jul. 19, 2007

Related U.S. Application Data

(60) Provisional application No. 60/760,263, filed on Jan. 19, 2006.

(51) Int. Cl.
*H04J 3/06* (2006.01)
(52) U.S. Cl. ...................... 370/519; 370/503
(58) Field of Classification Search .............. 370/395.1, 370/412, 516, 517, 518, 519, 503, 350; 709/248
See application file for complete search history.

(56) References Cited

U.S. PATENT DOCUMENTS

| | | | | |
|---|---|---|---|---|
| 6,324,586 B1 * | 11/2001 | Johnson | ................. | 709/248 |
| 7,254,402 B2 * | 8/2007 | Vayanos et al. | ........... | 455/456.1 |
| 7,412,371 B2 * | 8/2008 | Fisher et al. | ................. | 703/17 |
| 7,535,931 B1 * | 5/2009 | Zampetti et al. | ............ | 370/508 |
| 2009/0067844 A1 * | 3/2009 | Archambault et al. | ......... | 398/81 |

OTHER PUBLICATIONS

Bill White, Rav Meerwald, Jeff Nesbitt; "zSeries Qualified WDM Vendor: Cisco Systems", 20 pages, Redbooks Paper; Copyright IBM Corp. 2005.
Bill White, Rav Meerwald, Jeff Nesbitt; "zSeries Qualified WDM Vendor: Nortel Networks", 17 pages, Redbooks Paper; Copyright IBM Corp. 2005.
Pierre Cassier, Axel Ligny, David Raften; "GDPS/PPRC 100Km Distance Testing", 47 pages, IBM System z, May 2006.
Frank Kyne, Noshir Dhondy, David Raften, Mark Ratte; "GDPS Family—An Introduction to Concepts and Capabilities", 153 pages, ibm.com/redbooks, Redbooks, Dec. 2005.

\* cited by examiner

*Primary Examiner*—Hanh Nguyen
(74) *Attorney, Agent, or Firm*—Clements Bernard PLLC; Christopher L. Bernard; Tyler S. Brown

(57) ABSTRACT

In various exemplary embodiments, the present invention provides transport systems and methods incorporating absolute time references, such as global positioning system (GPS) time references and/or the like, and selective buildout delays, such as first-in, first-out (FIFO) buildout delays and/or the like. In one exemplary embodiment, the transport systems and methods of the present invention are used in conjunction with the International Business Machine Corporation (IBM) Geographically-Dispersed Parallel Sysplex (GDPS) integrated, automated application and data availability solution to meet and/or exceed the associated 10 microseconds transmit/receive path differential delay requirement. Other comparable uses are also contemplated herein, as will be obvious to those of ordinary skill in the art.

19 Claims, 4 Drawing Sheets

TRANSPORT SYSTEMS AND METHODS INCORPORATING ABSOLUTE TIME REFERENCES AND SELECTIVE BUILDOUT DELAYS

CROSS-REFERENCE TO RELATED APPLICATION(S)

This present non-provisional patent application claims priority to U.S. Provisional Patent Application Ser. No. 60/760,263 filed Jan. 19, 2006, and entitled "TRANSPORT SYSTEMS AND METHODS INCORPORATING ABSOLUTE TIME REFERENCES AND SELECTIVE BUILDOUT DELAYS", which is incorporated in-full by reference herein.

FIELD OF THE INVENTION

The present invention relates generally to the telecommunications, data storage, and optical networking fields. More specifically, the present invention relates to transport systems and methods incorporating absolute time references, such as global positioning system (GPS) time references and/or the like, and selective buildout delays, such as first-in, first-out (FIFO) buildout delays and/or the like. In one exemplary embodiment, the transport systems and methods of the present invention are used in conjunction with the International Business Machine Corporation (IBM) Geographically-Dispersed Parallel Sysplex (GDPS) integrated, automated application and data availability solution to meet and/or exceed the associated 10 microseconds transmit/receive path differential delay requirement. Other comparable uses are also contemplated herein, as will be obvious to those of ordinary skill in the art.

BACKGROUND OF THE INVENTION

According to IBM, "GDPS is an integrated, automated application and data availability solution designed to provide the capability to manage . . . remote copy configuration and storage subsystem(s), automate Parallel Sysplex operational tasks, and perform failure recovery from a single point of control, thereby helping to improve application availability." ("GDPS: The e-business Availability Solution," Noshir Dhondy, et al., IBM Executive Summary, March 2005). GDPS supports both synchronous and asynchronous forms of remote copy.

GDPS is a disaster recovery manager for IBM computers. GDPS monitors all the Logical Partitions (LPARs) in the Sysplex, both operating systems (OSS) and Coupling Facilities, it also monitors the Direct access storage device (DASD) whether Peer to Peer Remote Copy (PPRC) or Extended Remote Copy (XRC) is being used to mirror the data. A Systems Complex, commonly called a Sysplex, is one or more IBM System/390 processors joined into a single unit. Put another way, a Sysplex is an instance of a computer system running on one or more physical computers. Sysplexes are often isolated to a single system, but Parallel Sysplex technology allows multiple mainframes to act as one. Sysplexes can be broken down into LPARs each running a different operating system. Components of a Sysplex include: a Sysplex Timer which synchronizes all member systems' clocks; Global Resource Serialization (GRS), which allows multiple systems to access the same resources concurrently, serializing where necessary to ensure exclusive access; and Cross System Coupling Facility (XCF), which allows systems to communicate peer to peer.

GDPS may be used in, for example, geographically-redundant server applications, especially those involving transaction processing, etc. A typical application includes geographically diverse data centers. In such server applications, it is crucial that both primary and backup servers reflect real time information, especially in synchronous mode. In other words, transactions may be time stamped, and these time stamps must be consistent between primary and backup servers, for a variety of application-specific reasons. The geographically diverse servers are typically connected together through optical fiber, and the sites can be diverse up to 200 km distance. Of particular importance is the time information between the primary and backup servers between the geographically diverse locations. The primary and backup servers include a timer, such as the Sysplex Timer with regards to GDPS, and the timer is configured to synchronize the clocks on both servers to ensure consistency. In regards to geographically diverse locations, a timing reference must be used to provide synchronization.

Previously with regards to GDPS, an external time reference (ETR) link was used (i.e. a clock distributor/timer box was associated with each server complex) to sync primary and backup servers. Sync accuracy, however, was limited. For example, the IBM 9037 Sysplex Timer is a mandatory component of GDPS/PPRC. The Sysplex Timer provides an ETR to synchronize the time of day (TOD) clocks on attached servers in a GDPS/PPRC environment. The 9037 Sysplex Timer uses two link types: an ETR and a Control Link Oscillator (CLO). ETR links are connections between the Sysplex Timer and the server ETR ports providing clock synchronization between multiple servers. CLO links are connections between two Sysplex Timer units in High Availability mode allowing synchronization of the Sysplex Timer timing signals.

To ensure correct Sysplex Timer and server time synchronization, the end-to-end lengths of the transmit and receive fibers within an individual ETR or CLO link must be equal (within 10 meters). However, special care should be taken when using erbium-doped fiber amplifiers (EDFAs) or dispersion compensation units (DCUs) to ensure the end-to-end lengths of the transmit and receive fibers of the link are equal (within 10 meters). EDFAs and DCUs contain significant lengths of fiber, which must be included in the total fiber distance calculation. For long distances over fiber, these requirements are challenging and result in low accuracy.

More recently, IBM has integrated time synchronization functions previously provided via the ETR links, which operate at a data rate of 8 Mbps, into the intersystem channel (ISC) link which operates at 2.125 Gbps and provides other control functions beyond those provided by ETR links. These ISC links execute a proprietary server time protocol (STP) which is similar to the network time protocol (NTP). STP-capable ISC links are expected to replace ETR links over time. Advantageously, such an ISC link is faster and more accurate than the ETR link. However, ISC links are limited in distance below 100 km.

Despite these advances, the determination of transmit/receive path differential delay is still lacking in conventional systems and methods. This determination is very important because IBM specifies less than a 10 microsecond transmit/receive path differential delay requirement. This 10 microsecond transmit/receive path differential delay requirement is apportioned as follows: 5 microseconds for the fiber plant (including any required optical amplifiers and their associated dispersion compensating fiber), 2.5 microseconds for the electronic equipment at either end of the connection, and 2.5 microseconds for margin.

Referring to FIG. 1, the transmit/receive path differential delay is determined by first ascertaining the roundtrip delay between Sysplex A 10 and Sysplex Z 12 along both a transmit path 14 and a receive path 16. Time stamp 1 18 is associated with a message (or frame) upon transmission from Sysplex A 10 to Sysplex Z 12. Time stamp 2 20 is associated with the message upon receipt at Sysplex Z 12. Time stamp 3 22 is associated with the message upon transmission from Sysplex Z 12 to Sysplex A 10. Finally, time stamp 4 24 is associated with the message upon receipt at Sysplex A 10. The roundtrip delay is equal to the difference between time stamp 4 24 and time stamp 1 18, and the transmit/receive path differential delay is always assumed to be equal to zero, meaning that the transmit and/or receive path delay (the one-way delay) is equal to the difference between time stamp 4 24 and time stamp 1 18 divided by two. Clock 2 20 is then reset by the one-way delay to sync with clock 1 18, or vice versa. As described below, however, this one-way delay is often inaccurate, as it is rarely, if ever, actually equal to one-half of the roundtrip delay.

The problems with the above systems and methods are that: 1) the fiber disposed between Sysplex A 10 and Sysplex Z 12 is likely spliced differently between the transmit path 14 and the receive path 16 and/or the length of the transmit path 14 differs significantly from the length of the receive path 16; 2) one or more amplifiers 26, such as one or more erbium-doped fiber amplifiers (EDFAs) and/or the like, and/or one or more dispersion compensation modules (DCMs) 28, the one or more DCMs likely differing significantly in fiber length, are disposed between Sysplex A 10 and Sysplex Z 12, the one or more amplifiers 26 and/or DCMs 28 selectively affecting the delay between the transmit path 14 and the receive path 16; and 3) multiplexing, such as wavelength-division multiplexing (WDM), dense wavelength-division multiplexing (DWDM), or the like, is likely incorporated between Sysplex A 10 and Sysplex Z 12 (thereby allowing a plurality of protocols to be bundled per wavelength, such as Enterprise System Connection (ESCON) protocol, Fiber Channel (FC) protocol, etc.), the multiplexing scheme incorporated selectively affecting the delay between the transmit path 14 and the receive path 16. Each of these interventions contributes significantly to the transmit/receive path differential delay.

It should be noted that 5 microseconds of differential delay is approximately equivalent to a difference in length between the transmit fiber path and the receive fiber path of 1 km. It should also be noted that the electronic equipment budget of 2.5 microseconds is equivalent to approximately 530 bytes of data at a 2.125 Gbps line rate, the rate at which an STP capable ISC link operates. In order to deal with clock noise and variations in clock frequencies as well as supporting signal multiplexing, the data streams generally need to be buffered, typically via first-in/first-out (FIFO) registers. Depths (sizes) of these FIFOs are typically in the range of hundreds of bytes, with several FIFOs being present in the end-to-end datapath all with different fill levels. The variation in fill levels between the sum of all FIFOs in the transmit path versus the sum of all FIFOs in the receive path must be maintained below approximately 530 bytes in order for the buffering function itself to avoid introducing differential delay that exceeds the 2.5 microsecond requirement. Control of FIFO depth and its variation becomes a critical component to reducing the differential delay in the electronics components of the system.

As a result of the above-described improperly determined and/or uncorrected for transmit/receive path differential delay, time stamps may be inaccurate and may, in some circumstances, be duplicative, resulting in transaction processing overlaps and, in general, inadequate performance of the GDPS integrated, automated application and data availability solution, among other problems. The systems and methods of the present invention simply and effectively address these problems.

BRIEF SUMMARY OF THE INVENTION

In various exemplary embodiments, the present invention provides transport systems and methods incorporating absolute time references, such as GPS time references and/or the like, and selective buildout delays, such as FIFO buildout delays and/or the like. As described above, in one exemplary embodiment, the transport systems and methods of the present invention are used in conjunction with the IBM GDPS integrated, automated application and data availability solution to meet and/or exceed the associated 10 microseconds transmit/receive path differential delay requirement. Other comparable uses are also contemplated herein, as will be obvious to those of ordinary skill in the art.

In one specific embodiment, a network transport system includes a first server complex; a second server complex; wherein the first server complex is in communication with the second server complex via a transmit path and a receive path; means for measuring a transmit/receive path differential delay associated with the transmit path and the receive path, wherein the means for measuring the transmit/receive path differential delay comprise a local clock, and wherein the local clock is in communication with an absolute time reference; and means for selectively compensating for the measured transmit/receive path differential delay. The means for measuring the transmit/receive path differential delay comprise an algorithm operable for determining the difference between a delay associated with the transmit path and a delay associated with the receive path. Optionally, the absolute time reference comprises a GPS time reference. Optionally, the means for selectively compensating for the measured transmit/receive path differential delay comprise a FIFO buffer operable for selectively adding buildout delay to one or more of the transmit path and the receive path. The means for selectively compensating for the measured transmit/receive path differential delay further comprise a control circuit operable for controlling the operation of the FIFO buffer based on the measured transmit/receive path differential delay. Finally, the network transport system includes one or more WDM platforms.

In another specific embodiment, a network transport method includes measuring a transmit/receive path differential delay associated with a transmit path and a receive path communicatively linking a first server complex and a second server complex, wherein measuring the transmit/receive path differential delay comprises measuring the transmit/receive path differential delay using a local clock, and wherein the local clock is in communication with an absolute time reference; and selectively compensating for the measured transmit/receive path differential delay. Measuring the transmit/receive path differential delay comprises determining the difference between a delay associated with the transmit path and a delay associated with the receive path. Optionally, the absolute time reference comprises a GPS time reference. Optionally, selectively compensating for the measured transmit/receive path differential delay comprises selectively adding buildout delay to one or more of the transmit path and the receive path using a FIFO buffer. The FIFO buffer comprises a control circuit operable for controlling the operation of the FIFO buffer based on the measured transmit/receive path differential delay. Finally, the network transport method includes providing one or more WDM platforms.

In a further specific embodiment, a network transport device includes a WDM platform; a FIFO buffer disposed within the WDM platform operable for adding buildout delay to one or more of a transmit path and a receive path associated with the WDM platform; a control circuit disposed within the WDM platform operable for controlling the operation of the FIFO buffer based upon a measured transmit/receive path differential delay; and a local clock disposed within the WDM platform operable for communicating and syncing with a remotely-located absolute time reference. The network transport device also includes a filter disposed within the WDM platform operable for filtering out predetermined transmit path delays and receive path delays. The network transport can also include an integrated GPS receiver within the WDM platform operable for receiving a GPS time reference for the remotely-located absolute time reference. Alternatively, the integrated GPS receiver can include an antenna with satellite acquisition and tracking capabilities.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

In various exemplary embodiments, the present invention provides transport systems and methods incorporating absolute time references, such as GPS time references and/or the like, and selective buildout delays, such as FIFO buildout delays and/or the like. As described above, in one exemplary embodiment, the transport systems and methods of the present invention are used in conjunction with the IBM GDPS integrated, automated application and data availability solution to meet and/or exceed the associated 10 microseconds transmit/receive path differential delay requirement. Other comparable uses are also contemplated herein, as will be obvious to those of ordinary skill in the art.

Figure 1:
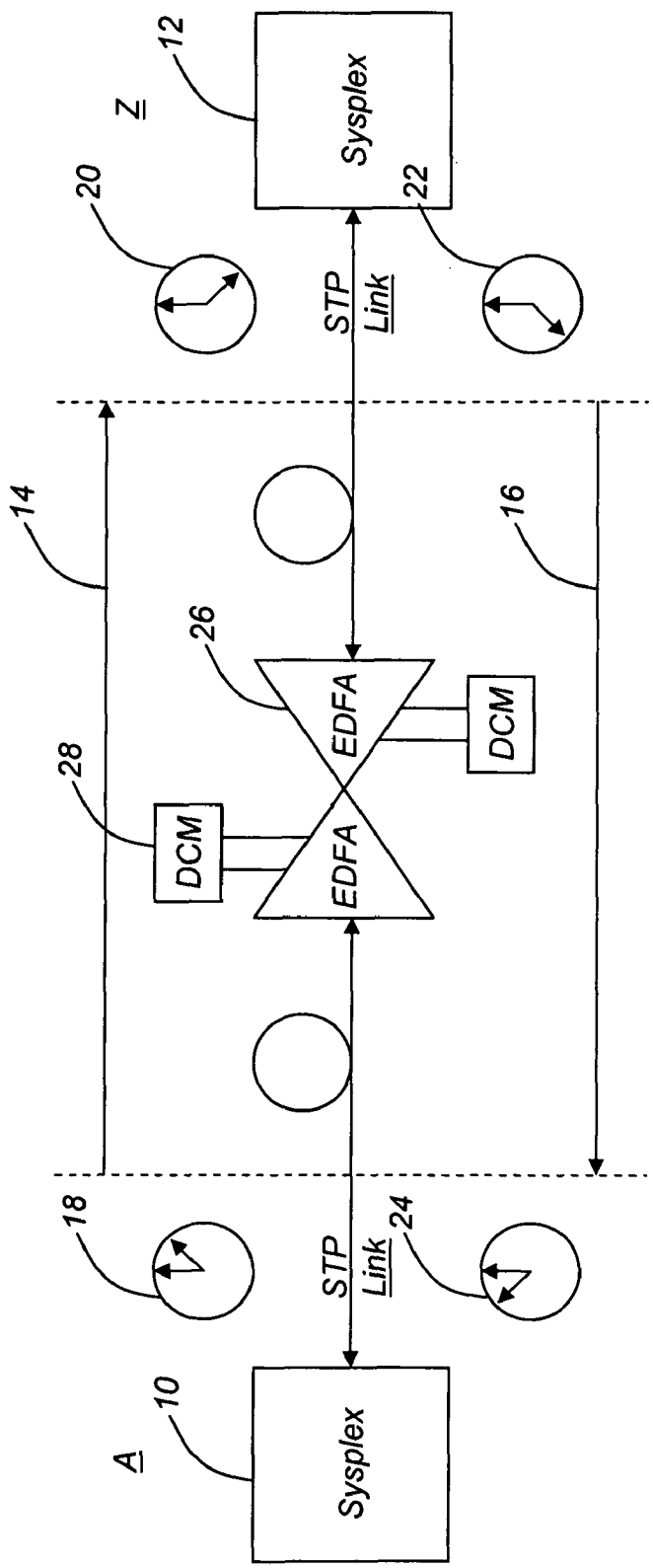
FIG. 1 is a schematic diagram illustrating a conventional transport solution and the transmit/receive path differential delay problems associated therewith.
Figure 2:
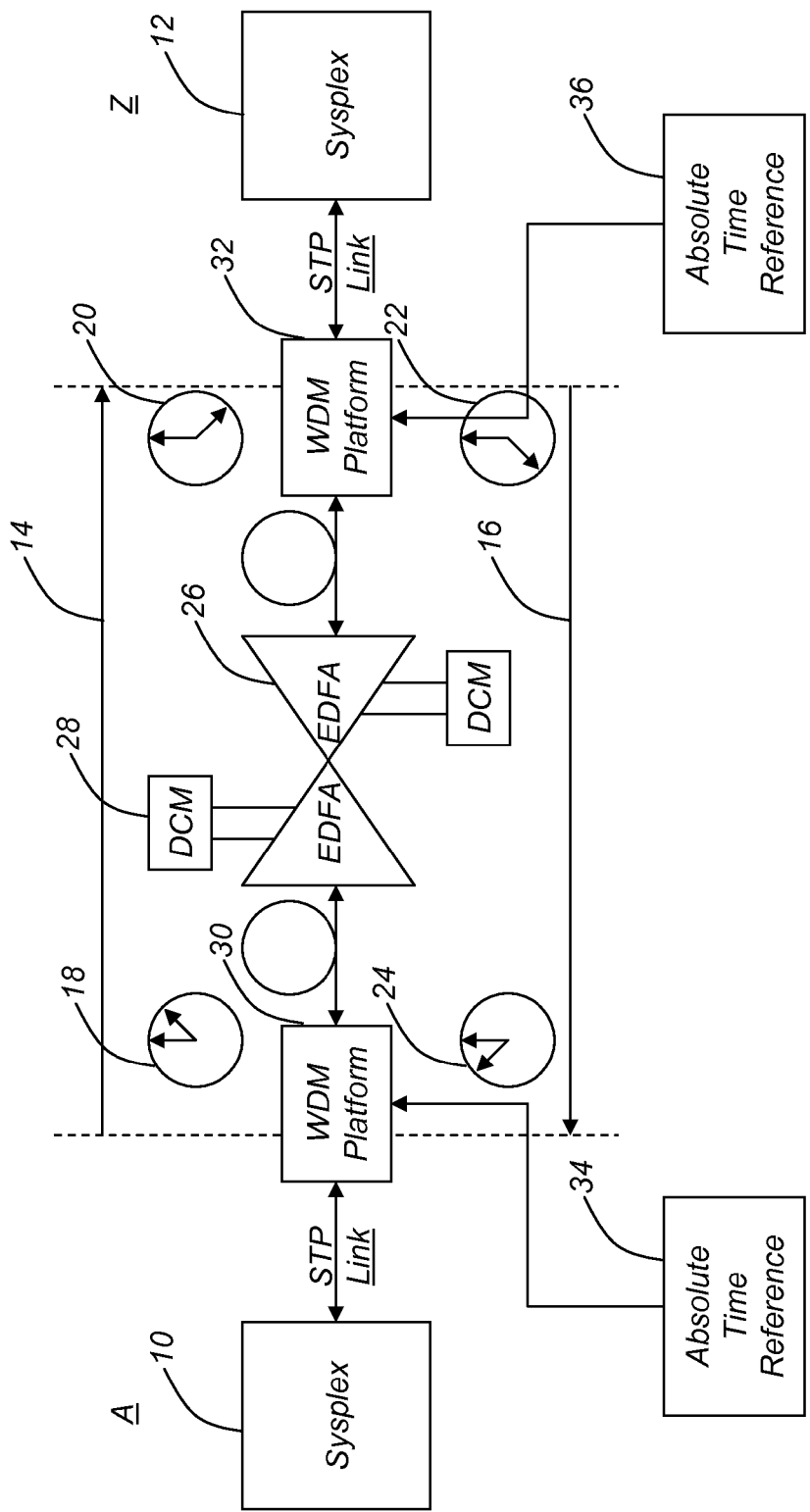
FIG. 2 is a schematic diagram illustrating the transport solution of the present invention, the transport solution incorporating absolute time references and selective buildout delays.

Referring to FIG. 2, Sysplex A 10 communicates with Sysplex Z 12 via a transmit path 14 and a receive path 16. Again, time stamp 1 18 is associated with a message (or frame) upon transmission from Sysplex A 10 to Sysplex Z 12. Time stamp 2 20 is associated with the message upon receipt at Sysplex Z 12. Time stamp 3 22 is associated with the message upon transmission from Sysplex Z 12 to Sysplex A 10. Finally, time stamp 4 24 is associated with the message upon receipt at Sysplex A 10. In the exemplary WDM case illustrated, these time stamps are provided by clock A 18,24 associated with WDM platform A 30 and clock Z 20,22 associated with WDM platform Z 32. As will be obvious to one of ordinary skill in the art, other suitable equipment may be substituted for the WDM platforms, and multiplexing does not have to be performed. The central idea is that a local clock is provided in proximity to each Sysplex. Clock A 18,24 is preferably in communication and synchronized with a first absolute time reference 34 and clock Z 20,22 is preferably in communication and synchronized with a second absolute time reference 36. Absolute time references A 34 and Z 36 are preferably GPS time references and/or the like, which are continually synchronized to a very high degree. For example, GPS time references are typically within 20 ns of one another. Thus, clock A 18,24 and clock Z 20,22 are continually synchronized to a very high degree.

Using the systems and methods of the present invention, the transmit/receive path differential delay is determined by first calculating the transmit path delay (A to Z delay, or AZd), which is equal to t2−t1. The receive path delay (Z to A delay, or ZAd), which is t4−t3, is then calculated. The transmit/receive path differential delay is simply the difference between AZd and ZAd, however AZd, ZAd, and this transmit/receive path differential delay cannot be accurately measured given the limitations of conventional systems and methods.

Once measured, the transmit/receive path differential delay is actually corrected for using the systems and methods of the present invention. If AZd<ZAd, then a ZAd−AZd buildout delay is selectively added in the A to Z direction via a FIFO buffer or the like. If AZd>ZAd, then a AZd−ZAd buildout delay is selectively added in the Z to A direction via a FIFO buffer or the like. Thus, selective buffering in one direction or the other (or both) is provided to account for and cancel out the measured transmit/receive path differential delay, thus ensuring that it never exceeds specified requirements. Buffer depth is used to compensate for transmit/receive path differential delay, alleviating the need for labor-intensive and expensive "physical" fixes. Such physical fixes are complicated by the fact that components cannot be fixed together, but must be addressed individually. The configuration of the exemplary WDM platforms 30,32 is illustrated in FIG. 3.

Figure 3:
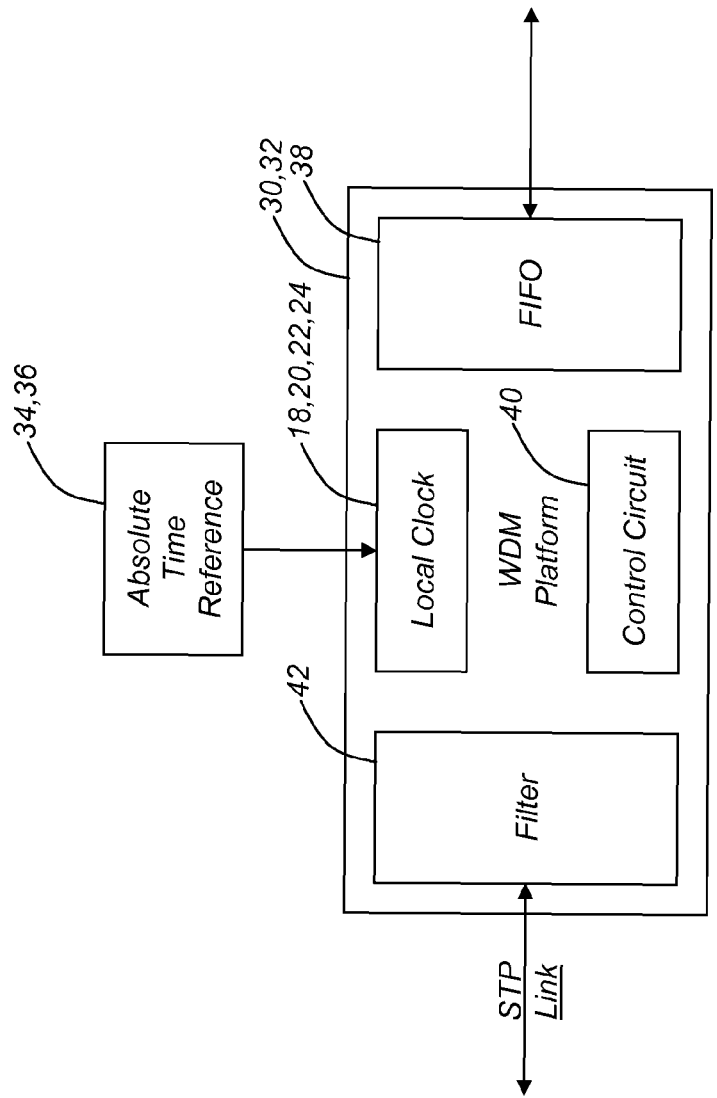
FIG. 3 is another schematic diagram illustrating the transport solution of the present invention.

Referring to FIG. 3, each WDM platform 30,32 includes a local clock 18,20,22,24 which is in communication with an absolute time reference 34,36, such as a GPS time reference and/or the like, and a FIFO buffer 38 and/or the like, as described above. In an exemplary embodiment, each WDM platform 30,32 includes an integrated GPS receiver with satellite acquisition and tracking capabilities through, for example, an external antenna. The GPS receiver is configured to provide the GPS time reference to the local clock 18,20, 22,24.

The Global Positioning System, usually called GPS, is the only fully-functional satellite navigation system. A constellation of more than two dozen GPS satellites broadcasts precise timing signals by radio, allowing any GPS receiver (abbreviated to GPSr) to accurately determine its location (longitude, latitude, and altitude) in any weather, day or night, anywhere on Earth. Many systems that must be accurately synchronized use GPS as a source of accurate time. For instance, the GPS can be used as a reference clock for time code generators or NTP clocks. Communications networks often rely on this precise timing to synchronize RF generating equipment, network equipment, and multiplexers.

In addition to positioning, the GPS provides a critical fourth dimension—time. Each GPS satellite contains multiple atomic clocks that contribute very precise time data to the GPS signals. GPS receivers decode these signals, effectively synchronizing each receiver to the atomic clocks. This enables users to determine the time to within 100 billionths of a second, without the cost of owning and operating atomic clocks.

Precise time is crucial to a variety of economic activities around the world. Communication systems, electrical power grids, and financial networks all rely on precision timing for synchronization and operational efficiency. The free availability of GPS time has enabled cost savings for companies that depend on precise time and has led to significant advances in capability.

Each WDM platform 30,32 also includes a control circuit 40 operable for playing data out of the FIFO buffer 38 at a predetermined rate. This predetermined rate may be varied (preferably gradually) as the transmit/receive path differential delay measured varies with changing environmental conditions, etc. In other words, the systems and methods of the present invention are real time and dynamic, the fill level of the FIFO buffer 38 being variable. For example, the 16-byte FIFO buffer 38 may be selectively changed from 10 bytes to 9 bytes, and a byte must be backed out. At a minimum, the FIFO buffer 38 should be reset at each initialization/re-initialization. Each WDM platform further includes a filter 42 operable for averaging-out jitter and other short term delays (e.g. FIFO fill variation, optical path delay variation, etc.) that are preferably ignored.

In accordance with the systems and methods of the present invention, delay adjustment capability is dependent upon FIFO depth and delay adjustment resolution is dependent upon FIFO width (e.g. for a 10-bit wide FIFO, the resolution for an STP operating at 2.125 Gbps is approximately 4.7 ns.

Figure 4:
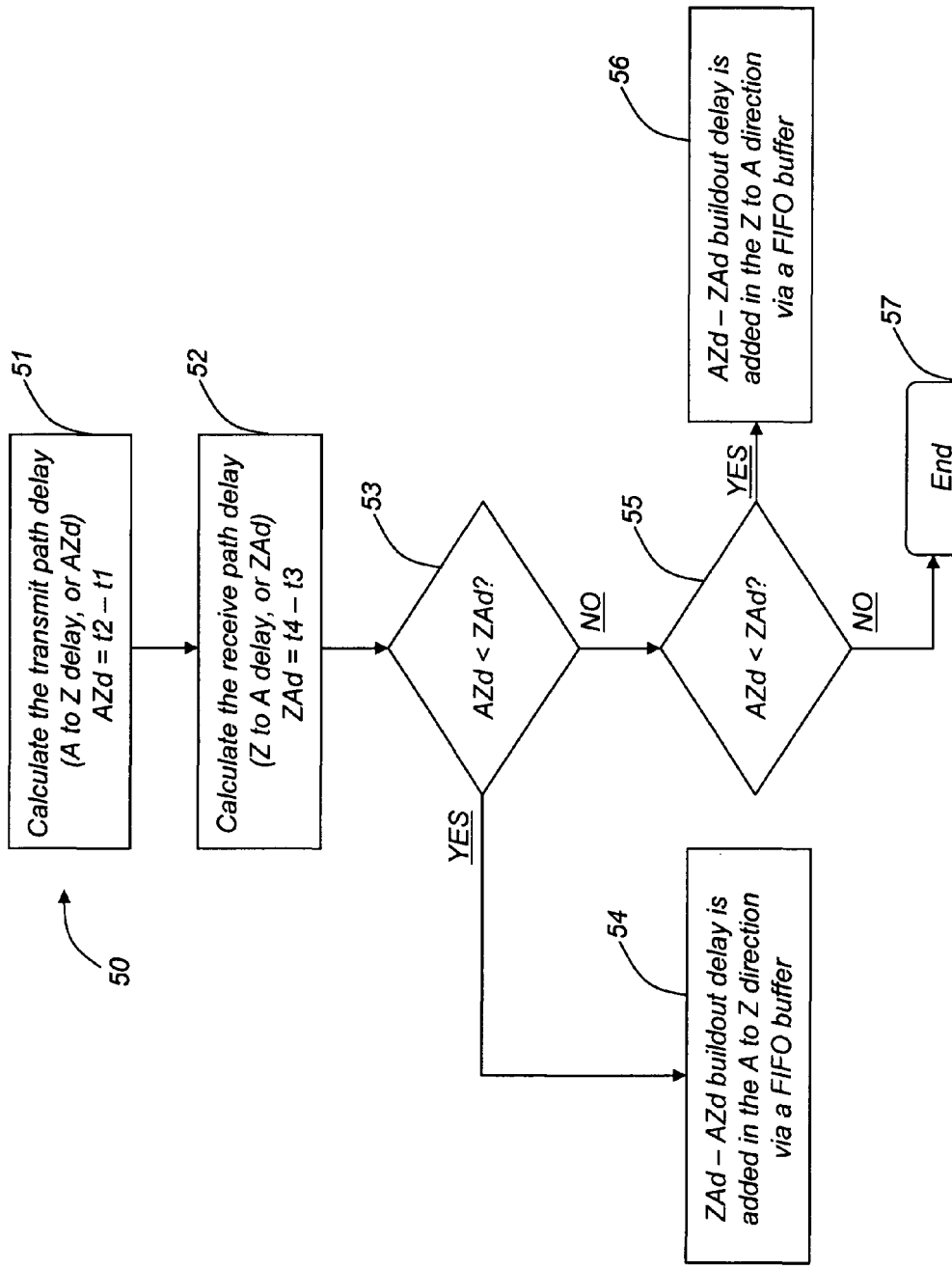
FIG. 4 is flowchart illustrating a method for measuring differential transmission path delays incorporating an absolute time reference, and providing a buildout delay to compensate for varying differential path delays due to, for example, optical transmission paths.

Referring to FIG. 4, an exemplary embodiment of the present invention includes a method 50 of measuring differential transmission path delays to an absolute time reference, and providing a buildout delay to compensate for varying differential path delays due to, for example, optical transmission paths. The method 50 can be used to calculate differential path delays between two locations A and Z which are geographically diverse, but which share the absolute time reference such as a GPS time reference and/or the like. The transmit path delay (A to Z delay, or AZd) is calculated based on t2−t1 (step 51), where t2 is a time stamp at the Z location referenced to the absolute time reference and t1 is a time stamp at the A location reference to the absolute time reference.

Additionally, the receive path delay (Z to A delay, or ZAd) is calculated based on t4−t3 (step 52), where t4 is a time stamp at the A location referenced to the absolute time reference and t3 is a time stamp at the Z location reference to the absolute time reference. If AZd is less than ZAd (step 53), then a buildout delay equal to ZAd−AZd is added in the A to Z transmission direction via a FIFO buffer (step 54). If ZAd is less than AZd (step 55), then a buildout delay equal to AZd−ZAd is added in the Z to A transmission direction via a FIFO buffer (step 56). Otherwise if AZd=ZAd, no buildout delay is added (step 57).

The method 50 can be utilized in any transmission system used to connect geographically diverse locations which require a certain differential delay to be met or exceeded. In an exemplary embodiment of the present invention, a dense-wave division multiplexing (DWDM) system such as, for example, the CIENA CN4200 available from CIENA Corporation of Linthicum, Md. is utilized to connect geographically diverse locations requiring a differential delay of a particular value or less. As discussed herein, optical transmission systems are particularly difficult to calculate differential path delays due to physical differences in the optical fibers. The systems and methods presented herein allow differential path delays to be calculated independent of the fiber characteristics utilizing absolute time references and provide for selective buildout delays to meet or exceed specific requirements.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A network transport system, comprising:
   a first server complex;
   a second server complex;
   wherein the first server complex is in communication with the second server complex via a transmit path and a receive path;
   means for measuring a differential delay associated with the transmit path and the receive path, wherein the means for measuring the differential delay comprises a local clock, and wherein the local clock is in communication with an absolute time reference;
   means for selectively compensating for the measured differential delay; and
   means for selectively mitigating predetermined transmit path delays and receive path delays.

2. The network transport system of claim 1, wherein the means for measuring the differential delay comprises determining the difference between a delay associated with the transmit path and a delay associated with the receive path.

3. The network transport system of claim 1, wherein the absolute time reference comprises a global positioning system (GPS) time reference.

4. The network transport system of claim 1, wherein the means for selectively compensating for the measured differential delay comprises a first-in, first-out (FIFO) buffer operable for selectively adding buildout delay to one or more of the transmit path and the receive path.

5. The network transport system of claim 4, wherein the means for selectively compensating for the measured differential delay further comprises a control circuit operable for controlling the operation of the FIFO buffer based on the measured differential delay.

6. The network transport system of claim 1, further comprising one or more wavelength-division multiplexing (WDM) platforms.

7. The network transport system of claim 6, wherein the one or more WDM platforms comprise an integrated GPS receiver for receiving a GPS time reference for the absolute time reference.

8. The network transport system of claim 1, wherein the first and second server complex are a Geographically-Dispersed Parallel Sysplex (GDPS) from IBM Corporation.

9. A network transport method, comprising:
   between a first server complex and a second server complex, measuring a differential delay associated with a transmit path and a receive path communicatively linking the first server complex and the second server complex, wherein measuring the differential delay comprises measuring the differential delay using a local clock, and wherein the local clock is in communication with an absolute time reference;
   between the first server complex and the second server complex, selectively compensating for the measured differential delay; and between the first server complex and the second server complex, selectively mitigating predetermined transmit path delays and receive path delays.

10. The network transport method of claim 9, wherein measuring the differential delay comprises determining the difference between a delay associated with the transmit path and a delay associated with the receive path.

11. The network transport method of claim 9, wherein the absolute time reference comprises a global positioning system (GPS) time reference.

12. The network transport method of claim 9, wherein selectively compensating for the measured differential delay comprises selectively adding buildout delay to one or more of the transmit path and the receive path using a first-in, first-out (FIFO) buffer.

13. The network transport method of claim 12, wherein the FIFO buffer comprises a control circuit operable for controlling the operation of the FIFO buffer based on the measured differential delay.

14. The network transport method of claim 9, further comprising providing one or more wavelength-division multiplexing (WDM) platforms.

15. The network transport method of claim 14, wherein the one or more WDM platforms comprise an integrated GPS receiver for receiving a GPS time reference for the absolute time reference.

16. The network transport method of claim 15, wherein selectively compensating for the measured differential delay comprises selectively adding buildout delay to one or more of the transmit path and the receive path using a first-in, first-out (FIFO) buffer, the FIFO buffer located in the one or more WDM platforms.

17. A network transport device, comprising:
a wavelength-division multiplexing (WDM) platform;
a first-in, first-out (FIFO) buffer disposed within the WDM platform operable for adding buildout delay to one or more of a transmit path and a receive path associated with the WDM platform;
a control circuit disposed within the WDM platform operable for controlling the operation of the FIFO buffer based upon a measured differential delay;
a local clock disposed within the WDM platform operable for communicating and synchronizing with a remotely-located absolute time reference; and
a filter disposed within the WDM platform operable for filtering out predetermined transmit path delays and receive path delays.

18. The network transport device of claim 17, further comprising an integrated GPS receiver within the WDM platform, the integrated GPS receiver operable for receiving a GPS time reference for the remotely-located absolute time reference.

19. The network transport device of claim 18, wherein the integrated GPS receiver comprises an antenna with satellite acquisition and tracking capabilities.

* * * * *